United States Patent [19]

Culter

[11] Patent Number: 4,617,495

[45] Date of Patent: Oct. 14, 1986

[54] AUTOCONVERGENCE OF A CATHODE RAY TUBE USING A SEMICONDUCTOR DETECTOR

[75] Inventor: Robert G. Culter, Beaverton, Oreg.

[73] Assignee: Tektronix, Inc., Beaverton, Oreg.

[21] Appl. No.: 685,420

[22] Filed: Dec. 24, 1984

[51] Int. Cl.$^4$ .............................................. H01J 31/26
[52] U.S. Cl. ....................................... 315/10; 358/69; 315/368
[58] Field of Search ................. 315/368, 371, 370, 10; 358/69

[56] References Cited

U.S. PATENT DOCUMENTS 4,456,853 6/1984 Robinder et al. .................... 315/368

Primary Examiner—Theodore M. Blum
Attorney, Agent, or Firm—John D. Winkelman; Joseph H. Smith

[57] ABSTRACT

A CRT calibration system is provided having a CRT with a display screen, an electron gun system, and a plurality of feedback elements. Each feedback element has an active area disposed proximately to the display screen at a preselected location such that an electron beam from the electron gun system can strike at least a portion of the active area. In response to being struck by electrons, each feedback element provides a feedback signal related to the area of the portion struck. The system also includes a detector system for detecting each feedback signal, and an integrating analog-to-analog converter which, in response, provides a digital signal related to the portion of the active area struck and thereby to the position of the electron beam relative to the particular feedback element interrogated. Also included is a control system for directing the electron beam to strike a sequence of portions of the active area for each feedback element, thereby evoking a corresponding sequence of feedback signals for each feedback element and a corresponding sequence of digital signals, enabling the control system to determine the location of each feedback element.

23 Claims, 16 Drawing Figures

FIG. 1.
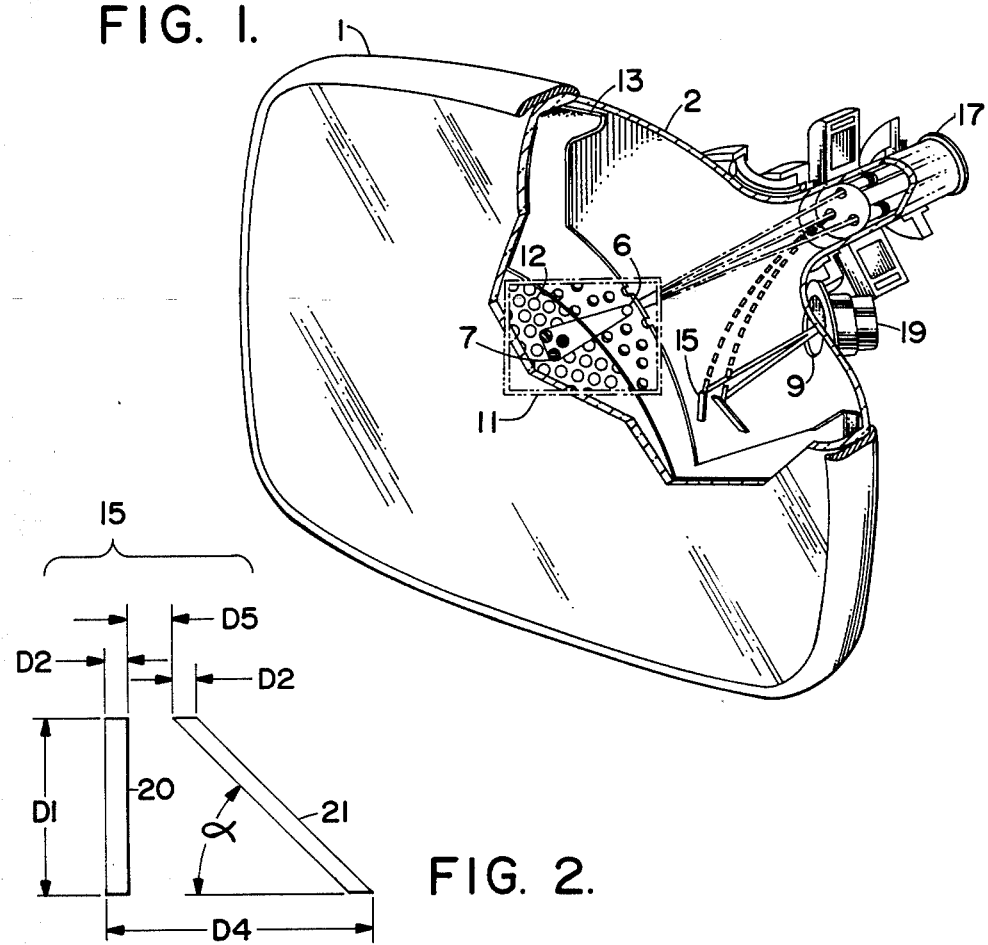
FIG. 2.
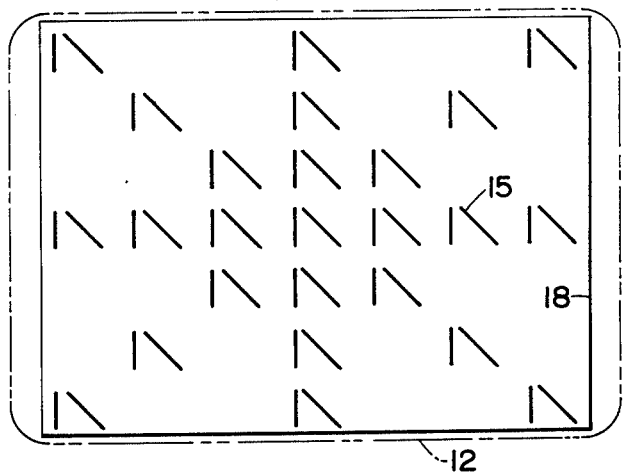
FIG. 3.

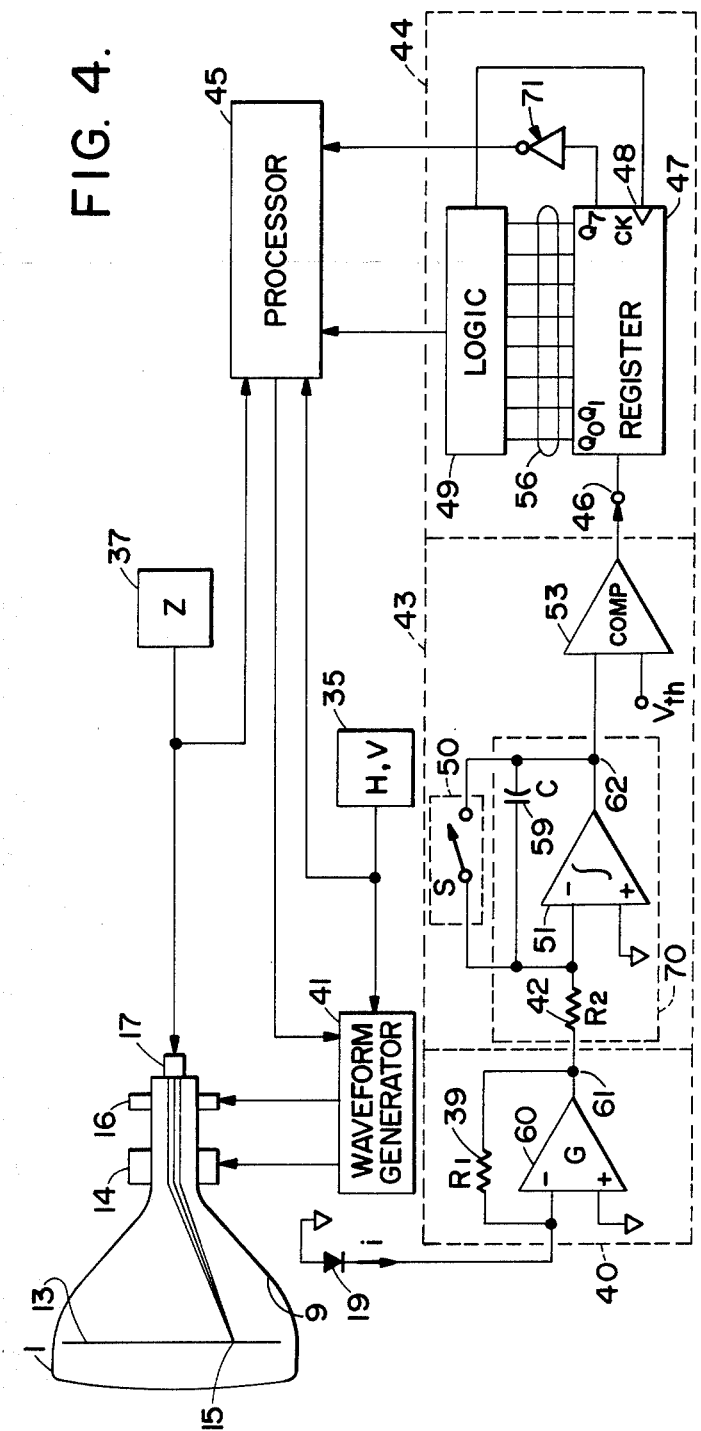
FIG. 4.
FIG. 5.
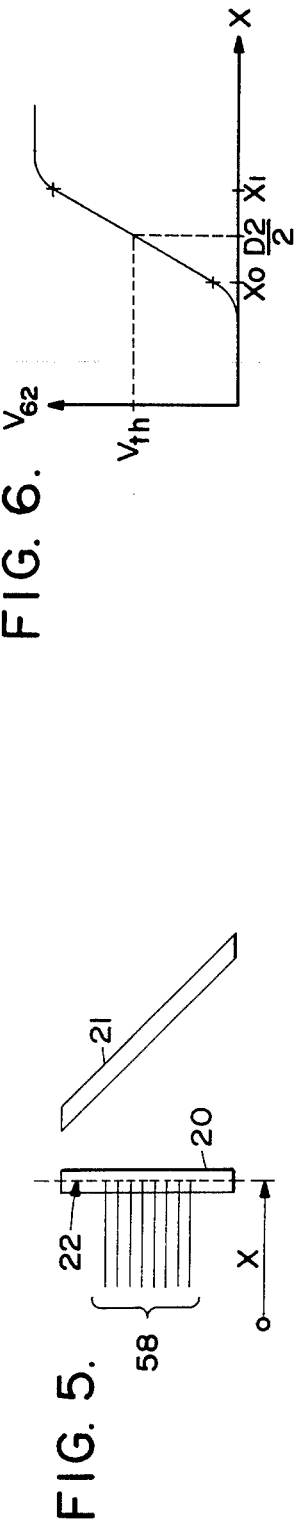
FIG. 6.

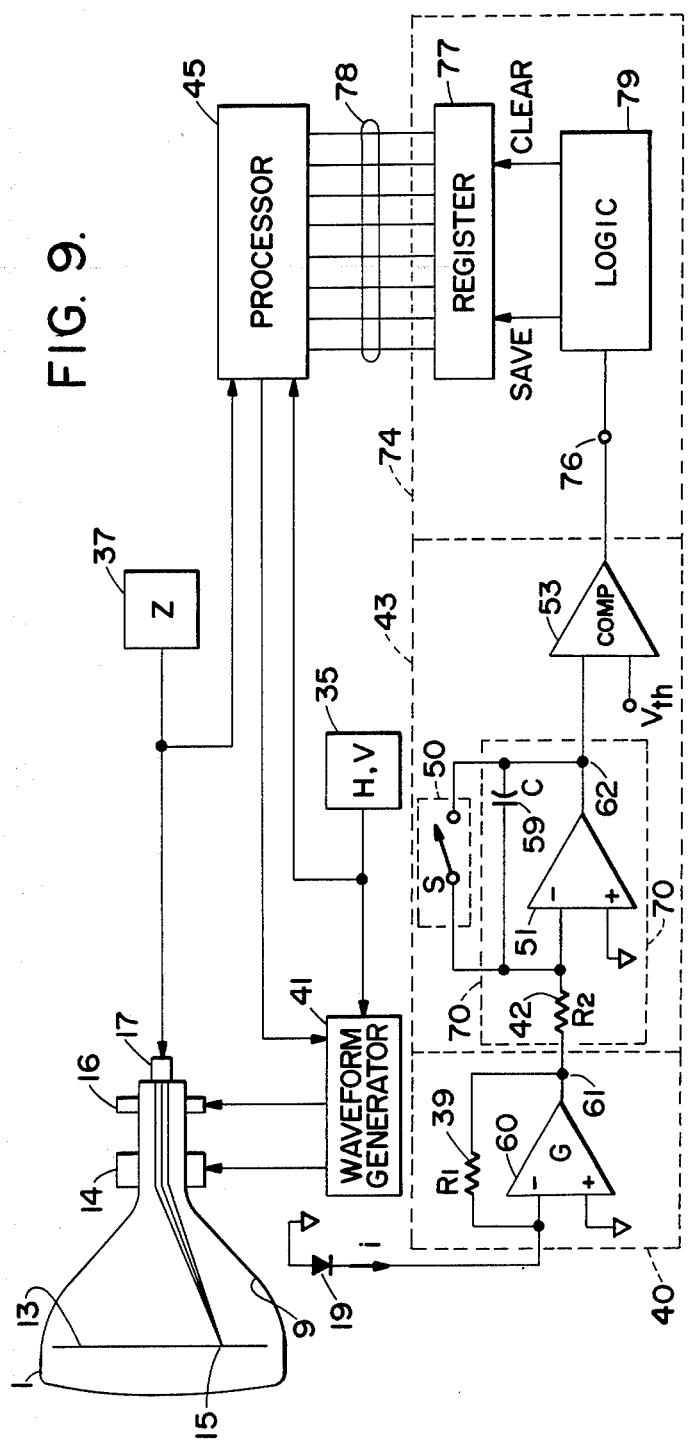
FIG. 9.
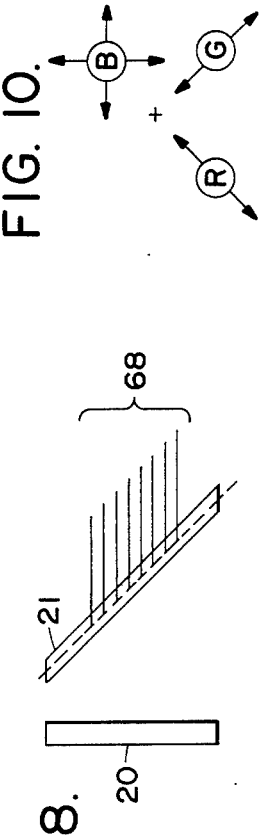
FIG. 10.
FIG. 11.
FIG. 8.

AUTOCONVERGENCE OF A CATHODE RAY TUBE USING A SEMICONDUCTOR DETECTOR

BACKGROUND OF THE INVENTION

This invention pertains to apparatus and techniques for detecting the position of an electron beam in a cathode ray tube (CRT) using a semiconductor photodetector, and to application of these techniques to automatic convergence in color CRT displays.

It is well known in the art of conventional three-gun, shadow-mask type, CRT displays, that the image produced will contain certain inherent distortions if dynamic corrections are not applied. These distortions include, for example, pincushion distortion caused by the center of deflection of the three electron beams being located apart from the center of curvature of the tube's display screen (present in mono-chromatic as well as color CRT's), trapezoidal distortion caused by at least two of the electron guns being located off the longitudinal axis of the tube envelope, and misconvergence of the beams at the tube's shadow-mask caused by the guns being displaced from one another laterally. With a delta-gun configuration, all three guns are spaced about the longitudinal axis of the gun assembly; with an in-line configuration, one gun is located on axis and the other two are spaced at either side.

The usual method of correcting geometric distortion is to impress certain analog correction factors onto the deflection signals used to deflect the beam or beams back and forth across the display screen to produce the image raster. Misconvergence is usually corrected by a similar impression of different analog correction factors onto the magnetic fields used to converge the three beams at the center of the screen. Of the two distortions, the most difficult to correct accurately and uniformly, and the one which requires periodic adjustment, is that of misconvergence.

Basic schemes for accomplishing dynamic beam convergence include the production of individual vertical and horizontal signals for each of the beams within the tube. Approximating somewhat the form of slightly skewed parabolas, the correction signals provide zero correction at the center of the screen and increasing correction as the beams are deflected away from center. Such a basic approach is usually adequate for a home television environment where viewers are not overly critical and viewing distances are on the order of 6 to 10 feet. In the field of information display, however, where viewers are more critical and viewing distances much shorter, and more importantly, where resolution requirements are much stricter, the amount of misconvergence left uncorrected by such a basic approach is unacceptable.

An improvement over the basic scheme described above is exemplified by the Model 4027 color graphics terminal produced by Tektronix, Inc., the assignee of the present invention, wherein the display screen is divided into several sub-areas and different correction signals, independently adjustable, are generated for each such division. Such an approach permits a more accurate convergence of the three beams over the entire area of the screen. In the Model 4027, the display screen is divided into nine sub-areas and the beams may be converged in each such area by the adjustment of three potentiometers, one for each beam. Although providing increased correction, such a scheme still requires the somewhat time-consuming adjustment of 27 different potentiometers; three for each of the nine sub-areas. Other known schemes divide the display screen into an even greater number of sub-areas (the Tektronix Model 690 color monitor, for example, uses thirteen) and requires the attendant adjustment of an even greater number of potentiometers. A common disadvantage of such schemes is the requirement for a human operator to assume full control of the display system for the time necessary to perform the several adjustments at each individual sub-area.

More recent developments include digital convergence schemes wherein correction information may be entered digitally, via a keyboard or other similar means, for conversion into analog signals producing the desired amount of beam adjustment. Examples of such schemes include those disclosed by Hallett et al., U.S. Pat. No. 4,203,051 and its companion, Sowter, U.S. Pat. No. 4,203,054, both of which are assigned to IBM, and the Model 382 color display developed by Systems Research Laboratories (SRL) of Dayton, Ohio. The IBM scheme is also described in an article by J. S. Beeteson, et al., "Digital System for Convergence of Three-Beam High-Resolution Color Data Display's" appearing at page 598 of the September 1980 issue of IBM J. Res. Develop., Vol. 24, No. 5. A description of the SRL convergence scheme may be found in a paper entitled "A 25-In. Precision Color Display for Simulator Visual Systems" by R. E. Holmes and J. A. Mays of SRL. A common characteristic of both the IBM and SRL systems is the use of a keyboard permitting operator entry of digital information representing the degree of movement necessary for each of the three beams to accomplish their convergence or other geometric adjustment. The IBM system permits the beams to be individually adjusted at 13 different points over the display area, while the SRL system permits adjustment at 256 different points.

A semi-automatic scheme for performing deflection adjustments only is disclosed by Bristow in U.S. Pat. No. 4,099,092. In that scheme, a photodiode array or solid-state imaging camera positioned in front of a CRT display, and a digital computer, are employed to generate correction factors for later application, via a programmable read-only memory, to the conventional deflection waveforms.

A common disadvantage of all the above schemes, however, is that a human operator is still required to assume full control of the system during the time necessary to perform the convergence or correction operation.

An expensive, but completely automatic convergence scheme is disclosed by Robinder, et al., in U.S. Pat. No. 4,456,853, assigned to Tektronix, Inc., which is especially useful for high resolution color graphic displays, such as the Tektronix Model 4115B Computer Color Display Terminal. In that apparatus, the tube is generally an otherwise conventional high resolution color CRT which includes a display screen of phosphorescent material, three electron guns for producing and directing electron beams toward the display screen, and a shadow mask. However, located on the back surface of the shadow mask, i.e., on the surface facing the electron guns, are a plurality of feedback elements constructed of phosphorescent material. In a preferred mode, these feedback elements are configured as two disjointed legs of a right triangle, one vertical and one inclined, spaced at preselected locations over the back surface of the shadow mask. As an electron beam is scanned across the face of the tube, the legs phosphoresce when struck by electrons in the beam, and the precise time of the phosphoresence of each leg is measured using a photomultiplier tube. The incremental time from the beginning of the raster to the time of phosphorescence of the vertical leg provides an indication of the horizontal position of the beam, while the incremental time from the beginning of the raster to the time of the phosphorescence of the inclined leg provides an indication of the vertical position of the beam. This information is obtained for each of the three electron beams and for each of the feedback elements, and the information is processed to provide convergence correction waveforms which are applied to the convergence magnet assembly and the deflection yoke (or plates) of the CRT.

Two important aspects of this latter technique are that the detector, a photomultiplier tube in the embodiment described above, have a very fast response in order to detect small changes in the incremental times involved as the raster traverses the legs, and that it be very sensitive in order to be able to detect the phosphorescence resulting from a single raster line on a single feedback element. These two requirements together result in a very expensive apparatus for autoconvergence and militates against the use of the more inexpensive detectors such as photodiodes, and other semiconductor-based photodetectors. As a general rule, such inexpensive devices can be made very sensitive, but at the expense of increased response time, or they can be made to have a very fast response time but with attendant degradation in sensitivity. At the present time, semiconductor-based photodetectors are not generally available which can achieve both the rapid response and the sensitivity required to simply replace the photomultiplier tube in the above application. What is needed is an inexpensive detection system for autoconvergence which does not require such high sensitivity or rapid response time.

SUMMARY OF THE INVENTION

In accordance with preferred embodiments of the invention, a CRT calibration system is provided having a CRT with a display screen, an electron gun system, and a plurality of feedback elements. Each feedback element has an active area disposed proximately to the display screen at a preselected location such that an electron beam from the electron gun system can strike at least a portion of the active area. Although the system has a plurality of feedback elements, for the purposes of discussion, the calibration apparatus will be discussed in terms of a single exemplary feedback element, since, generally, only one feedback element is interrogated at a time. In response to being struck by electrons, the feedback element provides a feedback signal related to the area of the portion struck. The system also includes a detector system for detecting the feedback signal and for providing a useful input signal level, hereinafter called a second signal, to an integrating analog-to-digital converter. In response, the converter provides a digital signal related to the position of the active area struck which can be correlated with the position of the electron beam relative to the feedback element. Also included is a control system for directing the electron beam to strike a sequence of portions of the active area of the feedback element, thereby evoking a corresponding sequence of feedback signals, a corresponding sequence of second signals, and a corresponding sequence of digital signals, for determining the location of the feedback element based on the sequence of digital signals.

In a peferred mode, the CRT includes a shadow mask interposed between the display screen and the electron gun system, with the feedback means located on the gun-side surface of the shadow mask and constructed of a phosphorescent material. Although the feedback elements may assume several different configurations, a particularly useful configuration is one where the active area is made up of two disjointed legs of a right triangle, with a first leg oriented vertically and a second leg inclined at an angle relative to the horizontal. In the general case, the angle is the arctangent of the ratio of the vertical spacing between adjacent horizontal rasters to the horizontal extent of an individual pixel.

The detector system, in a preferred embodiment includes a photodiode operated in an essentially photovoltaic mode, to achieve an acceptable signal-to-noise performance. This is followed by a transimpedance amplifier to boost the signal from the detector to a useful level. The integrating analog-to-digital converter includes an integrator for integrating the signals from the transimpedance amplifier, and a comparator. In operation, the integrator not only provides an output signal which is a measure of the total radiated energy received by the photodiode, but also serves to reduce the noise associated with the transimpedance amplifier. The comparator compares signals from the integrator with a known reference signal equal in value to an integrated signal from the integrator corresponding to a preselected portion of the active area being struck by the electron beam, that signal level indicating a reference position of the electron beam on the feedback element. The comparator then provides a digital signal corresponding to that comparison.

The control system includes a processor system for causing the CRT to produce a sequence of sets of electron beam rasters, each set having at least one raster line segment, and for directing each of these sets into a number of selected locations within a known distance of the particular feedback element involved.

Generally, there are two kinds of sets of rasters, one for determining horizontal position and one for determining vertical position. For the sets used in determining horizontal position, the raster line segments are aligned vertically forming a raster bar, i.e., the locus of points of the horizontal position of the ends of each line segment form two vertical straight lines. For the sets used in determining vertical position, the raster line segments are aligned at an angle forming a raster trapezoid, i.e., the locus of points of the ends of the raster line segments form two parallel lines which match the angle of the inclined leg of the feedback element. Similarly there are two sequences of sets of electron beam rasters, one for the sets corresponding to horizontal position and one for the sets corresponding to the vertical position.

Also included in the control system is a logic system coupled to receive the digital signals from the integrating analog-to-digital converter for selecting the locations to be used for each set of rasters, one location being selected for each digital signal received from the comparator. In the preferred mode, the logic system executes a successive approximation algorithm to select each of the locations to be used for each set of rasters. For example, for determining the horizontal position of the feedback element, the raster bar is moved iteratively horizontally back and forth across the vertical leg of the feedback element according to the successive approximation algorithm, each iteration causing a different amount of the active area of the feedback element to phosphoresce, and each iteration thereby yielding an output signal from the comparator and an additional bit of information as to the horizontal position of the vertical leg of the feedback element. This procedure is continued until the desired accuracy is obtained. The same procedure is followed for the inclined leg of the feedback element to obtain a horizontal position for the inclined leg which can then be related by simple trigonometry to the vertical position of the feedback element.

The logic system also has a register for storing information during the successive approximation process and for storing information corresponding to the finally identified location of the feedback element. It also provides this stored information to the processor system. The processor system then through a correction system corrects the electron beam position on the display screen based on the information obtained regarding the feedback element location.

BRIEF DESCRIPTION OF THE DRAWINGS

FIG. 1 shows a CRT for use with a preferred embodiment of the invention.

FIG. 2 shows a feedback element used in the CRT of FIG. 1.

FIG. 3 shows a typical distribution of feedback elements in the CRT of FIG. 1.

FIG. 4 is a schematic of one embodiment of a circuit for determining electron beam position relative to the feedback elements of FIG. 3.

FIG. 5 shows a feedback element and the relative location of a raster bar on that feedback element.

FIG. 6 is a graph illustrating the raster bar position transfer function for the circuit of FIG. 4.

FIG. 8 shows a raster trapezoid for use in determining the vertical position of an inclined leg of a feedback element.

FIG. 9 is a schematic of an alternative embodiment of a circuit for determining electron beam position.

FIG. 10 shows a typical delta-gun configuration and the degrees of freedom of each electron gun.

FIG. 11 shows an in-line gun configuration and the degrees of freedom of each electron gun.

DETAILED DESCRIPTION OF THE INVENTION

Figure 7A:
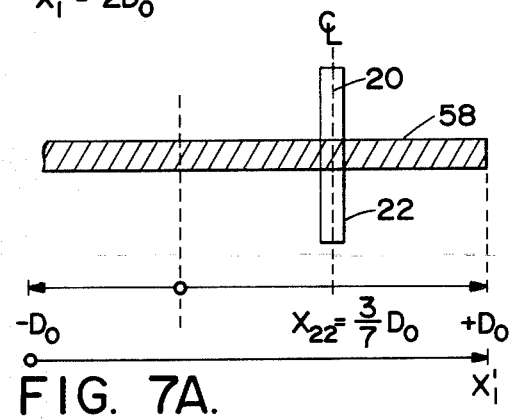
FIGS. 7A through 7E illustrate the placement of an iterative sequence of raster bars designed to successively approximate the position of a feedback element.

Shown in FIG. 1 is a cutaway view of a CRT 1 used in a preferred embodiment of the invention. CRT 1 includes a tube envelope 2, a phosphor-coated display screen 12 at one end of the tube, an electron gun assembly 17 and a perforated metal shadow mask 13 adjacent to the screen 12 and disposed over the gun-side surface of screen 12. Electron gun assembly 17, provides three electron beams, one for each of the three rasters red, green and blue. In this embodiment the electron beams are shown arranged in the delta configuration, as an example of one mode of operation, a configuration which is not meant to be limiting as to the scope of the invention. The teachings of the invention are equally applicable to other modes of operation, for example, to a three-gun linear configuration, and even to single gun configurations where precise knowledge of beam position is required. An imaginary window 11 shows an expanded view of a portion of CRT 1 illustrating the desired convergence of the electron beams at a point 6 on shadow mask 13 and the resulting triangular pattern 7 of the three beams on screen 12. Over the gun-side surface of shadow mask 13 are placed a plurality of feedback elements represented by feedback element 15, which is discussed in more detail below. The CRT 1 also includes a transparent viewing port 9 in the tube envelope 2, and attached thereto is a low noise semiconductor photodetector 19 adjacent viewing port 9 for detecting photons emitted from the feedback elements. With the exception of the feedback elements 15, the CRT 1 defines a conventional shadow-mask type color CRT.

The preferred configuration of feedback element 15 is shown in detail in FIG. 2, as it would appear from the observer's side of the CRT display 1. The element 15 is generally a phosphorescent material, for example P-46 or P-47 phosphor, deposited on the back of the shadow mask. It includes disjointed legs 20 and 21 of a right triangle, hereinafter called a chevron, the leg 20 being oriented vertically and the leg 21 being inclined at an angle $\alpha$ in a manner similar to the elements described in U.S. Pat. No. 4,456,853 discussed above. Typical dimensions are a height D1 of about 0.3" to about 1", an overall length D4 of about 0.3" to about 1.3", a leg width D2 in the horizontal direction of about 0.01" to about 0.1" and a leg separation D5 substantially equal to the horizontal leg width D2. The angle $\alpha$ is generally substantially 45°, although for some circumstances other angles are required, as will be discussed further below. Other shapes may also be used, for example, the inclined leg may precede the vertical leg, or even two inclined legs may be used. Also, the legs need not be disjointed.

As alluded to earlier, a plurality of chevrons are generally used, each element defining the center of a sub-area of display space over which the three beams of the CRT may be accurately converged and aligned. The number and location of the chevrons depends on the particular correction scheme that is to be used and the desired correction resolution. Illustrated in FIG. 3 is an example of a distribution of chevrons 15 which has been found particularly useful and which is designed to provide positional information both horizontally and vertically through the center of screen 12, as well as along the screen diagonals. Depending on design choice, the elements may be located wholly within a preselected quality area, defined by rectangle 18, or partially without.

A system for using CRT 1 is shown in schematic form in FIG. 4, and includes a convergence magnet assembly 14 and deflection yoke (or plates) 16 mounted around (or within) the neck portion of the tube envelope 2, a source 37 of Z-axis signals, a source 35 of horizontal and vertical deflection signals, and a waveform generator 41. Also included is a feedback circuit made up of a transimpedance amplifier 40, an integrating analog-to-digital converter 43, and a successive approximation circuit 44, the feedback circuit translating analog signals from photodetector 19 into digital information signals relating to the beam position within the CRT 1. In addition, the feedback circuit includes a processor 45 responsive to such digital information signals for producing correction functions for application to the gross convergence and deflection waveforms generated by waveform generator 41.

In operation, position detection for each particular feedback element is a two-tiered process, one tier for the horizontal position and one tier for the vertical position. For purposes of discussion, it will be assumed that position information is desired in the region of CRT 1 corresponding to feedback element 15. For the horizontal position measurement, a raster bar 58 made up of a plurality of vertically aligned horizontal raster line segments such as shown in FIG. 5 is generated on or near leg 20 of the chevron, i.e., element 15. If electrons in the raster bar strike leg 20, it will phosphoresce and light from the chevron will be detected by photodetector 19. In the preferred embodiment, photodetector 19 includes one or more P on N large area silicon diodes designed for use in the photovoltaic mode, i.e., a solar cell, such as a VTS-70 series photodiode from VACTEC OPTOELECTRONICS. In response to the phosphorescence of leg 20, photodetector 19 generates a current "i" which is amplified to a useful level by transimpedance amplifier 40, which includes an operational amplifier 60 and a feedback resistor 39 having a resistance $R_1$. The voltage signal at node 61 is then given by $$V_{61} = -iR_1.$$

The voltage $V_{61}$ is integrated by an integrator 70 which is a portion of the integrating analog-to-digital converter 43.

Integrator 70 includes an operational amplifier 51, an input resistor 42 having a resistance $R_2$, and a capacitor 59 having a capacitance C. The integration is performed for a time T which is at least the total on-time of the raster bar 58 and preferrably that plus the mean response time of the photodetector (typically about 1 msec.), so that the integrated signal is a measure of the total radiant energy received by photodetector 19. (It should be understood that the photodetector itself is, in effect, also an integrator, since the time associated with a single raster in a high resolution display is typically on the order of 16 μsec, while the response time of the photodetector is about 1 msec.) The integration time associated with integrator 70 is controlled by a switch 50 across capacitor 59, switch 50 being responsive to processor 45 which also controls the initiation of the raster bar. The further the raster bar extends onto leg 20, the more area of the chevron is struck by electrons, the more phosphorescence occurs, and the larger the integrated signal at node 62.

FIG. 6 shows a graph of the integrated signal, hereinafter called $V_{62}$, as a function of the horizontal position "x" of the edge of raster bar 58 as it passes through centerline 22 of leg 20, i.e., the graph represents the x-position transfer function of the integrator 70. Analytically, $V_{62}$ is given by the following equation:

$$V_{62} = \frac{R_1 \int_0^T i\, dt}{R_2 C}$$

As illustrated, there is a region of the transfer function between $x_o$ and $x_1$ that is substantially linear. This linearity results when leg 20 is wider than the effective spot size of the beam as degraded by the noise associated with the bandwidth of the video system, thereby providing a region where the transfer function is independent of spot size and video bandwidth. (Spot size refers to the 1/e gaussian cross-section of the electron beam used to trace the individual rasters in the raster bar 58.) By choosing a threshold voltage, $V_{th}$, in this linear region, the output signal $V_{62}$ can be compared with the threshold voltage $V_{th}$ to indicate whether the raster bar is on or off the chevron leg 20. The position of the raster bar 58 can be adjusted by iteration so that the output signal $V_{62}$ corresponds very precisely to the threshold voltage $V_{th}$, which in turn provides a measurement of the x-position of leg 20. For convenience, $V_{th}$ has been chosen to correspond to the centerline 22 of leg 20. As indicated in FIG. 4, this comparison of the output signal of integrator 70 with $V_{th}$ is accomplished by a comparator 53, which completes the function of the integrating analog-to-digital converter 43.

Operationally, the post integrator 70 acts essentially as a noise-reduction bandwidth limiter, in the preferred mode limiting the bandwidth to about 1 kHz, i.e., $R_2 C \approx 1$ msec. For these reasons, integrator 70 is regarded as an important feature of the invention in order to achieve the desired signal-to-noise ratio of the system. Of course, other types of integrators could be used for this purpose, for example a dual slope integrator. Also, it will be appreciated that the number of lines used in the raster bar 58 will be determined in large part by the desired signal-to-noise ratio. For example, a raster bar 58 with 25 line segments yields an incremental signal-to-noise ratio, peak-to-peak, of about 2.1 when using a P-47 phosphor in conjunction with a CRT from a Tektronix Model 4115B Computer Color Display terminal, a pair of VACTEC VTS-3170 photovoltaic diodes with a total effective area of about 5.8 cm² as photodetector 19, a resistance value for resistor 39 of about 10 Mohms, and a PMI OP-27GZ as operational amplifier 60. Similarly, using the same system as above, but substituting a P-46 phosphor which is better matched to the active region of the photodetector than the P-47 phosphor yields an incremental signal-to-noise ratio (peak-to-peak) of about 3.75. Both of these signal-to-noise ratios are more than adequate to achieve an essentially noise-free detection capability corresponding to an overall system convergence specification of 0.15 mm and indicate that a smaller number of line segments could be used, certainly as few as 15 could be used with the P-46 phosphor and perhaps even fewer. Also for some very small CRT's where the signal level is very high, one line segment may be adequate for raster 58.

The iteration procedure by which the position of the raster bar 58 is adjusted to coincide with centerline 22 is controlled by successive approximation circuit 44, which includes a successive approximation logic element 49, a shift register 47 and an inverter 71. The logic element 49 is coupled to the parallel output terminals 56 of shift register 47 and to its clock input terminal 48 in order to shift bits through the register.

The concept of the successive approximation scheme begins with an assumption that in the worst case, the uncorrected x-position coordinate of the raster 58 recorded in the system processor corresponding to the centerline 22 is within a known distance $D_o$ of the actual position of centerline 22, i.e., the known maximum error is $D_o$. Hence, by successively locating the raster bar 58 at various points along the horizontal direction within the limits $\pm D_o$, the precise location of the centerline 22 of leg 20 can be determined. An example of such an iterative process is illustrated in FIGS. 7A through 7E, where the horizontal position of centerline 22 has been chosen to be $x_{22}=(3/7)D_o$ or $0.4286D_o$. In the first step of the iteration the raster bar 58 is located at horizontal position $x=D_o$. As illustrated in FIG. 7A, this corresponds to a first position $X_1'=2D_o$, in the X' coordinate system which is a translation of the x coordinate system by a distance $-D_o$. This alternative coordinate system will be used throughout the discussion regarding the iterative procedure, since it simplifies the resulting analytical expressions which describe the iteration process.

Figure 7B:
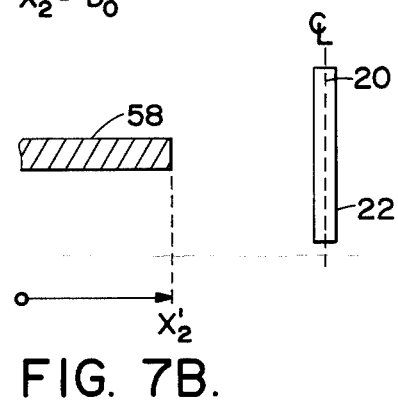
Figure 7C:
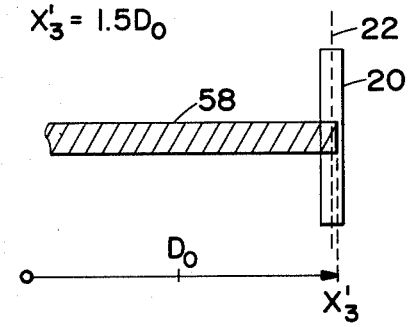
Figure 7D:
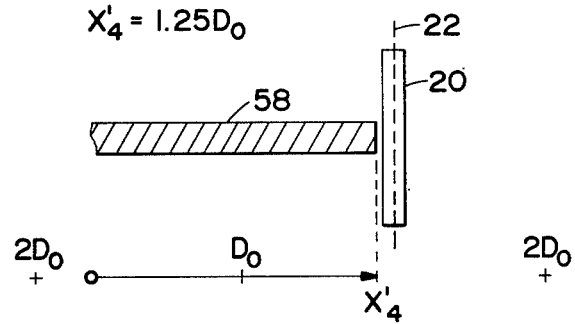

Since the raster bar completely traverses leg 20, the output signal of the integrator 70 will be larger than the threshold voltage $V_{th}$, and the comparator 53 will provide a signal corresponding to a logic "1" as the first bit presented at the input terminal 46 of shift register 47. Logic element 49 will clock the shift register and read the logic "1" at the parallel output terminals 56 of the shift register, in particular at $Q_o$. The logic "1" indicates to logic element 49 that raster bar 58 is beyond centerline 22, so it then provides a signal to processor 45 to initiate another raster bar 58 at $X_2'=D_o$, i.e, one-half the previous iteration of $2D_o$. That second iteration is illustrated in FIG. 7B. Since raster bar 58 does not extend to centerline 22, the comparator 53 will output a logic "0" and the second bit shifted into register 47 will be "0", i.e., now "0" at $Q_o$ and a "1" at $Q_1$. In response, logic element 49 will provide a signal to processor 45 to initiate raster bar 58 at a position halfway between the position corresponding to the most recent logic "1" and the position corresponding to the most recent logic "0", i.e., halfway between $2D_o$ and $D_o$, i.e., at $X_3'=1.5D_o$. This third iteration is illustrated in FIG. 7C. Since the raster extends beyond centerline 22, a logic "1" will be entered into register 47, and logic element 49 will cause processor 45 to generate a new raster bar located halfway between the position corresponding to the most recent logic "1" and the position corresponding to the most recent logic "0", i.e., halfway between $1.5D_o$ and $D_o$, or $X_4'=1.25D_o$.

As should now be apparent, the general algorithm applied by logic element 49 is $$X_i' = \begin{cases} 2D_o \text{ for } i = 0; \\ 2D_o(\tfrac{1}{2})^i \text{ for } i \geq 1 \text{ until a logic "0" occurs;} \\ (X_k' + X_j')/2 \text{ for } i > 1 \text{ after a logic "0" occurs;} \end{cases}$$

where $X_i'$ is the position of raster bar 58 in the i-th iteration; $X_k'$ is the position of the raster bar in the k-th iteration, which corresponds to the lowest significant logic "1" occurring before the i-th iteration; and $X_j'$ is the position of the raster bar in the j-th iteration, which corresponds to the lowest significant logic "0" occurring before the i-th iteration.

Figure 7E:
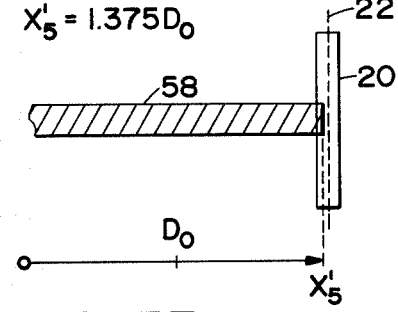
Figure 7F:
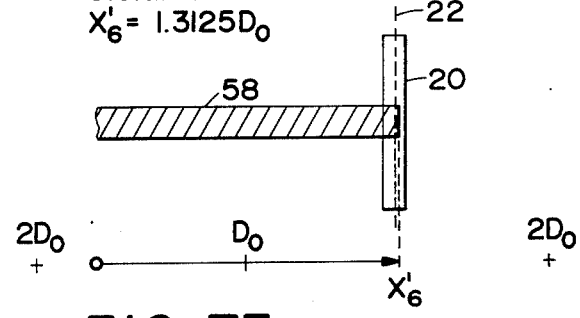

FIGS. 7E and 7F show two more iterations illustrating the rapid convergence on the position of centerline 22 located at $X'=1.4286D_o$. This process is then continued as many times as required to obtain the desired accuracy of the measurement of the position of leg 20. Once that accuracy has been attained, the sequence of bits stored in shift register 47 corresponds to the complement of a binary representation of the position of leg 20 normalized to the length $2D_o$. The sequence can then be read out serially through an inverter 71 to processor 45, thereby providing the processor with the position information needed for calculating horizontal correction functions to be applied when the electron beams are scanning the region of the CRT corresponding to feedback element 15. Such a readout to processor 45 may be performed all at once, or bit by bit as each bit of a new series of successive approximations is being entered into the register. Similar iterative procedures are carried out for each of the other two color rasters, and for each of the feedback elements. For a typical high resolution color graphics CRT display, the maximum error $\pm D_o$ is generally about 0.25", or 6.35 mm, and the desired accuracy is typically about 0.05 mm. This corresponds to a total of about 254 different regions where the raster bar could be located (2×6.35 mm/0.05 mm). Hence, to represent the position of leg 20 in binary numbers requires 8 bits ($2^8=256$) or an 8-bit shift register 47. A higher accuracy would, of course, require a larger shift register.

For the inclined leg 21 of feedback element 15, and for the other feedback elements, the same iterative process as that described above is applied except that for the inclined legs a raster trapezoid 68 is used which is oriented at a 45° angle to match angle $\alpha$ of leg 21 as shown in FIG. 8. This orientation is used since it can be attained easily by shifting each successive raster line segment horizontally one pixel, assuming, of course, that the vertical separation between successive raster lines is equal to the horizontal spacing of each pixel. If some other separation of successive raster lines is used, then the angle $\alpha$ should be altered accordingly, i.e. if the vertical separation is V and the horizontal extent of one pixel is H, $\alpha=\arctan(V/H)$. Once the horizontal position of an inclined leg of a chevron is determined, it can be shown by simple trigonometry that if $\Delta H$ is the difference in horizontal position between the inclined leg and the vertical leg, then the distance "s" of the top of the raster bar 68 from the top of the chevron is given by the following equation:

$$s = \Delta H - 2 \cdot D2.$$

Those skilled in the art will appreciate that the above iteration scheme is only one of many that could be used, some of which may be more or less efficient. For example, a very inefficient but very direct approach would be to simply move the raster bar horizontally the least increment, i.e., 0.05 mm, one time after another, until the threshold $V_{th}$ is reached. The above scheme using successive approximation circuit 44 has been chosen for its efficiency, its simplicity, its versatility in using different approximation schemes, and its speed of operation. Also, in other schemes, it may be desirable to use a grey code or an error correcting code to designate the position of the beam rather than the direct binary representation that was chosen.

Those skilled in the art will also recognize the algorithm described above as being identical to that used in successive approximation digital-to-analog converters. For that particular algorithm, a hardware solution is already available. Such a solution is illustrated in FIG. 9 which is similar to FIG. 4 except that successive approximation circuit 44 has been replaced by a circuit 74 known in the art as a successive approximation register. Included in circuit 74 in a successive approximation logic element 79 which controls the signal levels at the parallel output terminals 78 of a storage register 77. Successive approximation logic element 79 is available as a TTL integrated circuit from several manufacturers, including for example Advanced Micro Devices in their series AM 2502/3/4 or National Semiconductor in their series DM 2502/3/4. The output signal levels at terminals 78 are coupled to processor 45 and provide a binary representation of the desired position of the raster. For example, for an 8-bit register 77, the sequence [10000000] represents the position $X_1'=2D_o$, the sequence [01000000] represents the position $X'=D_o$ (i.e., $2D_o(\frac{1}{2})$, the sequence [00100000] represents the position $X'=D_o2$ (i.e., $2D_o(\frac{1}{2})^2$), and so forth. The successive approximation process, then consists of starting with the most significant bit and successively trying a logic "1" in each bit, i.e., for the sequence [10000000], the processor will provide a raster 58 at $X'=2D_o$. Upon trying [10000000], the integrator output signal $V_{62}$ will be larger than $V_{th}$, and the comparator will provide a logic "1". Since the indication is that $X'=2D_o$ is too large, the logic "1" in the sequence [10000000] is removed from the register 77 and the next most significant bit is tried, i.e., a sequence [01000000]. When $V_{th}$ is larger than $V_{62}$, the logic "1" remains in that bit. After the full iteration process, i.e., after the least significant bit has been tried, the digital word at the parallel output terminals 78 is equivalent to the desired position of the raster 58. That position information can then be used by processor 45 in calculating the appropriate correction functions as before.

Having obtained the position information for each of the three raster beams relative to each feedback element, beam convergence is relatively straightforward. For example, in the delta-gun configuration, there are four degrees of beam adjustment available to converge the CRT. (See FIG. 10) The letters R, G, and B indicate the particular colors red, green, and blue, respectively, produced by the beams, and the arrows indicate the typically available adjustment directions. As is the convention, the red and green beams may be moved in one diagonal direction, each toward or away from a common convergence point, represented in FIG. 10 by a small cross, while the blue beam may be moved both horizontally and vertically. Once the positions of the beams have been determined relative to the feedback elements as described above, the positions of the beams relative to each other are known and all three beams can be moved into spacial coincidence at the convergence point, conventionally, the red and green first to form a yellow indication, and then the blue to form the white indication of complete coincidence. In the case of a CRT with an in-line type of gun as illustrated in FIG. 11, there are again four degrees of beam adjustment to obtain convergence. As before, the letters R, G, and B designate the particular color. Typically, the center beam is fixed, i.e, movable only by deflection, while the two outer beams may each be moved in two directions. To converge the beams, the outer beams are merely moved as necessary to the center beam. The methods already presented for determining the relative positions of the beams are equally applicable to the in-line configuration. The above convergence schemes for both the delta configuration and the in-line configuration can be achieved by applying standard correction waveform techniques. Such correction waveforms are well known in the art. See, for example, the patent assigned to IBM, and the patent assigned to SRL cited earlier in the specification.

Important advantages of the above-described system are many. For example, replacing an expensive, high quality photomultiplier tube (about $130) with an inexpensive silicon photodetector (about $30) can dramatically decrease the costs associated with a high quality autoconvergence system, thereby making such systems more readily available with lower priced displays. Also, no high voltage system is required for photovoltaic detectors as for photomulipler systems, thereby decreasing the maintenance problems associated with such high voltage systems. In addition, silicon photodetectors have more stable gain characteristics than photomultiplier tubes, making for more repeatable performance. Moreover, silicon detectors are smaller, use less power, are more easily hybridized, and are less fragile than photomultiplier tubes.

Those skilled in the art will appreciate that the above techniques are not restricted to photovoltaic diodes, but that they also include other detectors which have high signal noise ratios. For example, the photodetector 19 could still be a photomultiplier tube with its threshold voltage set to correspond to the raster bar half on the chevron legs, although there appears to be no advantage to using such an implementation. It is unlikely, however, that photoconductive diodes would be used because of the high noise level associated with the reverse bias typically applied in the photoconductive mode. If that reverse bias were reduced, however, such that the photoconductive device were essentially operating in the photovoltaic mode, they, too, could be used. This is similarly the case with phototransistors which are essentially photoconductive diodes with gain.

Another approach that may prove useful, depending on the noise characteristics of the detectors used, includes making the feedback elements of materials capable of emitting secondary electrons and positioning collectors of secondary electrons inside the tube enclosure which are accessible from the outside via a suitable conductor.

In yet another alternative, the feedback elements may be formed as a plurality of apertures in a conductive/insulative coating deposited over the gun-side surface of the shadow mask 13, the insulative coating being next to the shadow mask. Via external electrical connection to both the shadow mask and the conductive layer, it is possible to detect both positive and negative indications of a raster bar. When the bar is in the area defined by an element aperture, a beam current will be induced in the shadow mask; when the beam is elsewhere in the display area, a beam current will be induced in the conductive overlay. The first condition may be considered a positive indication, and the second, a negative indication. Processing of the feedback currents to produce the desired correction signals is accomplished via the procedure outlined earlier.

Although the preceding discussion has been directed primarily to automatic beam convergence, the basic concept applies as well to the automatic correction of known types of geometric distortion. To perform such correction, it is only necessary to know the desired position of each converged raster bar relative to the known physical location of its respective feedback element. That physical location may be determined by physical measurement during the manufacturing process or it may be obtained via the correction system itself. Once the display is converged and adjusted to geometric acceptance, it is a simple matter to store the detected position of a given raster bar relative to its feedback element and then maintain that position via future automatic adjustment.

As will be recognized by those skilled in the art, the concept of a feedback element within a CRT is not limited to shadow-mask type color CRT's, but is applicable as well to other CRT's, monochromatic or color, having either single or multiple gun structures. Most of the principles regarding beam convergence in a shadow-mask CRT apply equally well to controlled beam misconvergence in a multi-beam monochromatic CRT having a single shared deflection system. For example, monochromatic display systems are known wherein two or more electron beams are deflected in parallel across a display medium to produce an image raster having an increased number of raster lines or a decreased frame rate. In such systems, it is precise beam misconvergence that is important, rather than precise convergence. Geometric correction, of course, is important in both color and monochromatic CRT's, whether a shadow mask is employed or not.

For those CRT's having no shadow mask, the feedback elements are most conveniently spaced around the periphery of the image quality area, either by being formed on a surrounding support frame placed within the tube or by being formed on the display screen itself. As long as the feedback element is located outside the image quality area, the effect on the displayed image will be minimal and the element may be formed as described earlier.

While the preferred embodiments of the present invention have been shown and described, it will be apparent to those skilled in the art that many changes and modifications may be made without departing from the invention in its broader aspects. Therefore, the appended claims are intended to cover all such modifications, changes, and applications that fall within the true spirit and scope of the invention.

I claim:

1. A cathode ray tube calibration system comprising: a cathode ray tube having:
   a display screen;
   electron gun means for producing an electron beam directed toward said display screen;
   feedback means having an active surface disposed proximately to said display screen at a preselected location such that said electron beam can be directed to strike at least a portion of said active surface, for providing a feedback signal which is related to the area of said portion that is struck;
   detector means for detecting said feedback signal and for providing a second signal in response thereto which is a function of said area of said portion that is struck;
   converter means for integrating said second signal and for issuing a digital signal in response thereto;
   control means for directing said electron beam to strike a sequence of portions of said active surface thereby evoking a sequence of said feedback signals, a sequence of said second signals, and a sequence of said digital signals, and for determining a location of said feedback means based on said sequence of digital signals.

2. A system as in claim 1 wherein said cathode ray tube further includes a shadow mask interposed between said display screen and said electron gun means, and wherein said feedback means comprises a phosphorescent material disposed at a preselected location on a surface of said shadow mask facing said electron gun means.

3. A system as in claim 2 wherein said cathode ray tube has a vertical spacing of dimension V between horizontal raster lines and wherein said cathode ray tube provides pixels having a horizontal extent H wherein said feedback means is configured as two legs of a right triangle, with a first leg oriented vertically and a secong leg inclined at an acute angle $\alpha$ whose tangent is V/H.

4. A system as in claim 2 wherein said detector means comprises a photodiode operated in a photovoltaic mode.

5. A system as in claim 4 wherein said detector means comprises a transimpedance amplifier coupled to receive input signals from said photodiode, said transimpedance amplifier providing said second signals in response thereto.

6. A system as in claim 5 wherein said converter means comprises an integrator coupled to receive said second signals, and a comparator coupled to receive integrated signals from said integrator, said comparator comparing said integrated signals with a signal having a level equal in magnitude to an integrated signal from said integrator indicating a reference position of said electron beam on said feedback means, and providing said digital signals corresponding to that comparison.

7. A system as in claim 6 wherein said control means comprises processor means for causing said cathode ray tube to produce a sequence of raster bars, each raster bar having at least one raster line segment, and for directing each of said raster bars into one of a number of selected locations within a known distance of said feedback means.

8. A system as in claim 7 wherein said control means further comprises logic means coupled to receive said sequence of digital signals from said converter means for selecting said locations for each of said raster bars in response to said sequence of said digital signals.

9. A system as in claim 8 wherein said logic means selects one of said locations in response to each of said digital signals in said sequence of digital signals.

10. A system as in claim 9 wherein said logic means executes a successive approximation algorithm to select each of said locations to iteratively arrive at a location of the feedback means.

11. A system as in claim 10 wherein said logic means further comprises register means for storing information corresponding to said location of said feedback means and for providing a signal containing said information to said processor means.

12. A system as in claim 11 wherein said processor means further comprises correction means for correcting electron beam position on said display screen in response to said information regarding feedback means location.

13. A system as in claim 1 wherein said converter means comprises an integrator coupled to receive said second signals and a comparator coupled to receive integrated signals from said integrator, said comparator comparing said integrated signals with a fixed voltage equal in level to an integrated signal from said integrator corresponding to a preselected portion of said active surface being struck by said electron beam, and providing said digital signals corresponding to that comparison.

14. A system as in claim 13 wherein said control means comprises processor means for causing said cathode ray tube to produce a sequence of raster bars, each raster bar having at least one raster line segment, and for directing each of said raster bars into one of a number of selected locations within a known distance of said feedback means.

15. A system as in claim 14 wherein said control means further comprises logic means coupled to receive said sequence of digital signals from said converter means for selecting said locations of each of said raster bars in response to said sequence of said digital signals.

16. A system as in claim 15 wherein said logic means selects one of said locations in response to each of said digital signals in said sequence of digital signals.

17. A system as in claim 16 wherein said logic means executes a successive approximation algorithm to select each of said locations to iteratively arrive at a location of said feedback means.

18. A system as in claim 1 wherein said cathode ray tube comprises a plurality of said feedback means disposed at preselected locations spaced about in proximity of said display screen.

19. A system as in claim 7 wherein each of said raster bars comprises a plurality of parallel raster line segments.

20. A system as in claim 14 wherein each of said raster bars comprises a plurality of parallel raster line segments.

21. A cathode ray tube calibration system comprising:
a cathode ray tube having:
  a display screen;
  electron gun means for producing an electron beam directed toward said display screen;
  feedback means having an active surface disposed proximately to said display screen at a preselected location such that said electron beam can be directed to strike at least a portion of said active surface, for providing a feedback signal which is related to the area of said portion that is struck;
  detector means for detecting said feedback signal and for providing a second signal in response thereto which is a function of said area of said portion that is struck;
  converter means for integrating said second signal and for issuing a digital signal in response thereto;
  control means for directing said electron beam to surface, execute a sequence of raster line segments, each of said segments striking different portions of said active surface lying on the same raster line, thereby evoking a sequence of said feedback signals, a sequence of said second signals, and a sequence of said digital signals, and for determining a location of said feedback means based on said sequence of digital signals.

22. A method of measuring electron beam position in a cathode ray tube relative to a feedback element located in said cathode ray tube in a position to be struck by said electron beam, said feedback element issuing a signal functionally related to the area struck by said electron beam, comprising the steps of:
(a) providing a sequence of sets of electron beam line segments, each set having a geometric extent which when said set is moved into coincidence with a portion of said feedback element for a preselected period of time will cause said feedback element to issue a feedback signal related to the position of said set relative to said feedback element;
(b) detecting said feedback signals and issuing a sequence of second signals in response to said feedback signals, each second signal in said sequence being functionally related to the area struck by each set of raster line segments;
(c) integrating each second signal over time to obtain a single value for each second signal, each single value related to the position of the corresponding set of raster line segments;
(d) selecting the sequence of sets of raster line segments to provide a measure of the position of said feedback element.

23. The method of claim 19 wherein the selection of step (d) is according to a successive approximation algorithm.

* * * * *